United States Patent
Chen et al.

(10) Patent No.: US 12,307,763 B2
(45) Date of Patent: May 20, 2025

(54) SYSTEMS AND METHODS OF CONTROLLING RESOURCE DISTRIBUTION TO A FIELD

(71) Applicant: Verdi Expeditions Inc., Vancouver (CA)

(72) Inventors: Arthur Chen, Burnaby (CA); Roman Andrew Kozak, Vancouver (CA); Yu Zheng Jiang, Vancouver (CA); Charles Yicheng Ju, Vancouver (CA); Andre Peter Kamal Tewfik, St. Albert (CA)

(73) Assignee: Verdi Expeditions Inc. (CA)

( * ) Notice: Subject to any disclaimer, the term of this patent is extended or adjusted under 35 U.S.C. 154(b) by 596 days.

(21) Appl. No.: 17/576,499

(22) Filed: Jan. 14, 2022

(65) Prior Publication Data
US 2023/0230372 A1 Jul. 20, 2023

(51) Int. Cl.
*G06V 20/10* (2022.01)
*A01B 79/00* (2006.01)
*A01B 79/02* (2006.01)

(52) U.S. Cl.
CPC .......... *G06V 20/188* (2022.01); *A01B 79/005* (2013.01); *A01B 79/02* (2013.01)

(58) Field of Classification Search
CPC .................................................. A01B 79/02
See application file for complete search history.

(56) References Cited

U.S. PATENT DOCUMENTS

| | | | |
|---|---|---|---|
| 9,886,016 B2 | 2/2018 | Bermudez Rodriguez et al. | |
| 2004/0083833 A1* | 5/2004 | Hitt ...................... | A01G 25/167 73/866.5 |
| 2011/0035059 A1* | 2/2011 | Ersavas ................ | A01G 25/167 455/466 |
| 2012/0016497 A1* | 1/2012 | Marsters ............ | G05B 19/0426 700/23 |
| 2013/0306749 A1* | 11/2013 | O'Brien ................. | A01G 25/16 239/11 |

(Continued)

FOREIGN PATENT DOCUMENTS

| | | |
|---|---|---|
| CA | 3108902 A1 | 3/2020 |
| WO | WO-2017/085557 A1 | 5/2017 |

OTHER PUBLICATIONS

Foreign Search Report on PCT Dtd Apr. 15, 2023.

*Primary Examiner* — Nathan L Laughlin
(74) *Attorney, Agent, or Firm* — Foley & Lardner LLP

(57) ABSTRACT

System and methods to control resource distribution to fields are provided. A data processing system can identify a plurality of zones of the field, and can receive, from a client computing device, registration information of a node. The registration information can correlate the node with a zone of the field. The data processing system can obtain, via a gateway device and from the node, a first data file including field metric data and a second data file including third party data that pertains to the field. The data processing system can determine a resource distribution schedule based at least in part on data of the first data file and data of the second data file. The data processing system can receive, via the gateway device, a prompt from the node, and can provide an instruction to control a valve to regulate resource distribution to a portion of the field.

20 Claims, 10 Drawing Sheets

(56) References Cited

U.S. PATENT DOCUMENTS

| | | | |
|---|---|---|---|
| 2015/0319941 A1* | 11/2015 | Klein | G05B 19/0426 |
| | | | 700/284 |
| 2016/0219804 A1* | 8/2016 | Romney | G05B 19/042 |
| 2017/0359974 A1* | 12/2017 | Whalley | A01G 25/162 |
| 2018/0325050 A1* | 11/2018 | Bye | A01G 25/162 |
| 2019/0141919 A1* | 5/2019 | Kundra | G06V 20/188 |
| | | | 348/159 |
| 2020/0337256 A1* | 10/2020 | Larsen | G05D 7/0617 |
| 2023/0089304 A1* | 3/2023 | Sakkan | H04W 4/029 |
| 2023/0397550 A1* | 12/2023 | Flach | E03F 1/002 |

* cited by examiner

SYSTEMS AND METHODS OF CONTROLLING RESOURCE DISTRIBUTION TO A FIELD

FIELD

Background

Agricultural fields can include one or more types of crops or other plant life. However, one or more crops growing in a field may have varying need for resources based on the type of crop, nature of the field and its surroundings, or other climate factors. It can be challenging to accurately and efficiently provide the appropriate resources to the appropriate crop or crops.

SUMMARY

At least one aspect is directed to a system to control resource distribution to a field. The system can include a data processing system comprising one or more processors coupled with memory. The data processing system can identify a plurality of zones of the field, and can receive, from a client computing device, registration information of a node. The registration information can correlate the node with a zone of the plurality of zones of the field. The data processing system can obtain, via a gateway device and from the node, a first data file. The first data file can include field metric data. The data processing system can obtain a second data file. The second data file can include third party data that pertains to the field. The data processing system can determine a resource distribution schedule based at least in part on the field metric data of the first data file and the data that pertains to the field of the second data file. The data processing system can receive, via the gateway device, a prompt from the node. Responsive to the prompt, the data processing system can provide to the node via the gateway device, an instruction to control a valve to regulate resource distribution via the valve to a portion of the zone of the plurality of zones of the field.

At least one aspect is directed to a node. The node can be disposed in a field to control resource distribution to the field. The node can include a machine readable label to provide registration information to a scanner of a client computing device. The node can include a sensor to obtain field metric data of the field. The node can include a control system that can generate a payload that includes the field metric data. The node can transmit the payload via an antenna of the node to a gateway device via a bidirectional communication protocol. The control system can transmit a prompt, via the antenna and the bidirectional communication protocol, to the gateway device. The prompt can include a query for instruction. Responsive to the prompt, the control system can receive from the gateway device via the bidirectional communication protocol, an instruction to control a valve to regulate resource distribution via the valve to a portion of a zone of the least one of a plurality of zones of the field. The instruction can be based on the field metric data and based on third party data that pertains to the field.

At least one aspect is directed to a method of controlling resource distribution to a field.

The method can include identifying, by a data processing system comprising one or more processors coupled with memory, a plurality of zones of the field. The method can include receiving, by the data processing system from a client computing device, registration information of a node. The registration information can correlate the node with a zone of the plurality of zones of the field. The method can include obtaining, via a gateway device and from the node, a first data file. The first data file can include field metric data. The method can include obtaining a second data file. The second data file can include third party data that pertains to the field. The method can include determining a resource distribution schedule. The resource distribution schedule can be based at least in part on the field metric data of the first data file and the data that pertains to the field of the second data file. The method can include receiving, via the gateway device, a prompt from the node. The method can include providing to the node via the gateway device, an instruction to control a valve to regulate resource distribution via the valve to a portion of the zone of the plurality of zones of the field. For example, the instruction can be provided responsive to the prompt.

At least one aspect is directed to a method. The method can provide a system to control resource distribution to a field. The system can include a data processing system comprising one or more processors coupled with memory. The data processing system can identify a plurality of zones of the field. The data processing system can receive, from a client computing device, registration information of a node. The registration information can correlate the node with a zone of the plurality of zones of the field. The data processing system can obtain, via a gateway device and from the node, a first data file comprising field metric data, and can obtain a second data file, the second data file comprising third party data that pertains to the field. The data processing system can determine a resource distribution schedule based at least in part on the field metric data of the first data file and the data that pertains to the field of the second data file.

The data processing system can receive, via the gateway device, a prompt from the node. Responsive to the prompt, the data processing system can provide to the node via the gateway device, an instruction to control a valve to regulate resource distribution via the valve to a portion of the zone of the plurality of zones of the field.

At least one aspect is directed to a method. The method can include providing a node to dispose in a field to control resource distribution to the field. The node can include a machine readable label to provide registration information to a scanner of a client computing device. The node can include a sensor to obtain field metric data of the field. The node can include a control system to generate a payload that includes the field metric data and to transmit the payload via an antenna of the node to a gateway device via a bidirectional communication protocol. The control system can transmit a prompt, via the antenna and the bidirectional communication protocol, to the gateway device. The prompt can include a query for instruction. The control system can receive from the gateway device via the bidirectional communication protocol, an instruction to control a valve to regulate resource distribution via the valve to a portion of a zone of the least one of a plurality of zones of the field. The instruction can be based on the field metric data and based on third party data that pertains to the field.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
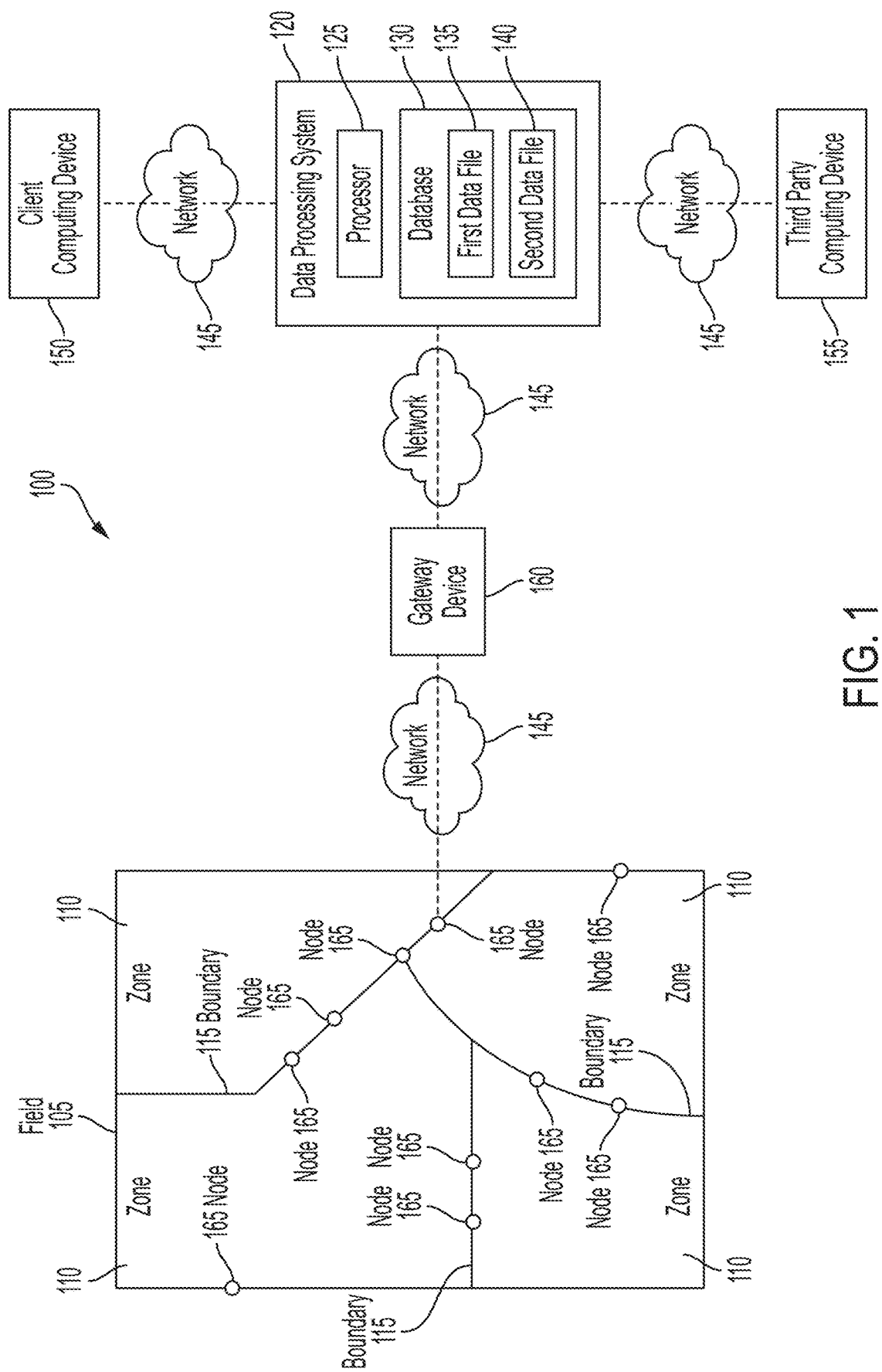
FIG. 1 is an illustration of an example system to control resource distribution in a field, in accordance with implementations.

Following below are more detailed descriptions of various concepts related to, and implementations of, methods, apparatuses, and systems of controlling resource distribution to a field. The various concepts introduced above and discussed in greater detail below may be implemented in any of numerous ways.

Efficient crop management can be a challenge. Resources such as water, fertilizer, or pest control needed by crops can vary based on the type of crop, location, topography, soil consistency, shape of the field, or prevalence of sun or shade on the field, among other factors. The variance in needs between one or more crops growing in different portions of a field can lead to inconsistent yields, insufficient resource distribution, or an underuse or overuse of resource deployment to certain portions of the field. These inefficiencies can waste resources such as water or fertilizer, and can unnecessarily waste power used to provide, deliver, or transport the resources. These inefficiencies can also cause reduced or inferior crop yields, or crop failure.

At least one technical solution is directed to systems, methods, and devices to control resource distribution to a field, (e.g., to a crop growing in a field of a farm). The systems, methods, and devices described herein can identify one or more zones of a field. Devices (e.g., nodes) can be disposed in the field, for example along boundaries (e.g., borders) of the zones. The nodes can control valves that distribute water, fertilizer, combinations thereof or other resources to the field, such as to one or more crops growing in the field). The systems, methods, and devices can identify zones of fields, and can determine the position of the nodes in the field. The nodes can collect data about the field and provide this data to a data processing system. Based on this data or additional data that pertains to the field (e.g., weather data), the data processing system can determine a dynamic schedule for resource distribution to the field at or beyond zone-level granularity. For example, based on analysis of sensed data on the zones, the data processing system can determine that more water should be distributed to a first zone than to an adjacent (or remote) second zone. The nodes can prompt the data processing system for resource distribution instructions, and based on these instructions the nodes can control valves to distribute the resource from pipes associated with the nodes to one or more zones that are associated with the nodes.

The nodes can be disposed in one or more fields to control distribution of resources to the fields. The nodes can include at least one machine readable optical label that can provide registration information to a scanner of a client computing device. The node can also include at least one sensor that can sense or obtain field metric data for the field. The node can include at least one control system to generate a payload (e.g., data packet(s)) that includes the field metric data. The node can include at least one antenna. Via the antenna and using a communication protocol, the control system can transmit the payload to at least one gateway device. The control system can also transmit a prompt (e.g., query or poll) to the gateway device to request instructions from the data processing system related to resource distribution or valve control. Responsive (e.g., subsequent) to the prompt, the control system can receive from the gateway device an instruction to control at least one valve. The instruction can be based on the data included in the payload, additional data related to the field, or combinations thereof. The control system can proceed to open, close, or otherwise actuate the valve to control the distribution of water or another resource out from the valve and onto the field or crops present therein.

Thus, the systems, methods and devices described herein can provide dynamic, comprehensive and granular (e.g., zone based or node based) control of resource distribution to different fields or different zones of a field. This optimized resource distribution saves resource usage and related energy costs, and can result in improved crop yield relative for example to a static irrigation system.

FIG. 1 depicts an example system 100 to control resource distribution in at least one field 105. The field 105 can be land that is cultivated or capable of being cultivated, such as farmland, cropland, or other area of earth. The field 105 can include farmland for plants, animals, and combinations thereof. The field 105 can be delineated by fence, pipes, troughs, or other barriers, or can be open with unmarked boundaries. The field 105 can have a symmetrical or regular shape (e.g., rectangle, square, or circle) or can have an irregular or asymmetrical shape. The field 105 can be level or substantially level (e.g., +/−10 degrees). The field 105 can have a flat, sloped or varied topography. For example the field 105 can include one or more hills, valleys, protrusions, or obstacles, and can include farm equipment. One or more crops can grow in the field 105. The crops can be for human or animal consumption, or used for fuel. The crops can be arranged in rows in the field 105, or can be arranged in symmetrical or asymmetrical patterns or configurations. The field 105 can also include animal habitat, such as feeding, living, or sleeping areas for livestock.

The field 105 can include at least one zone 110. The zone 110 can be or include a section or portion of the field 105. The zone 110 can vary in shape, topography, or size, and can be symmetrical, regular, asymmetrical, or irregular in shape. The zones 110 of the field 105 can be the same size as one another, or can have different sizes relative to one other. All or a portion of the field 105 can be divided into zones. For example, 80% of the field 105 can be included on a zone 110, with the remaining 20% of the field not being part of a defined zone 110. The boundaries 115 of the zone 110 can be delineated with farm infrastructure such as a fences, barriers, or pipes that can convey water, food, fertilizer, or pesticide. The boundaries 115 can also be defined by topographical features, such as a row, mound, or ditch. The boundaries 115 can also be not visibly marked in the field 105.

The system 100 can include at least one data processing system 120. The data processing system 120 can include at least one server having at least one processor 125. For example, the data processing system 120 can include a plurality of servers located in at least one data center or server farm. The data processing system 120 can include multiple, logically-grouped servers and facilitate distributed computing techniques. The logical group of servers may be referred to as a data center, server farm or a machine farm. The servers can be geographically dispersed. The data processing system 120 can include at least one computation resource, server, processor or memory. The data processing system 120 can be part of or include a cloud computing environment. A data center or machine farm can be administered as a single entity, or the machine farm can include a plurality of machine farms. The servers within each machine farm can be heterogeneous—one or more of the servers or machines can operate according to one or more type of operating system platform. The data processing system 120 can include servers in a data center that are stored in one or more high-density rack systems, along with associated storage systems located for example in an enterprise data center. The data processing system 120 with consolidated servers in this way can improve system manageability, data security, the physical security of the system, and system performance by locating servers and high performance storage systems on localized high performance networks. Centralization of all or some of the data processing system 120 components, including servers and storage systems, and coupling them with advanced system management tools allows more efficient use of server resources, which saves power and processing requirements and reduces bandwidth usage. The data processing system 120, can include hardware elements, such as one or more processors, logic devices, or circuits.

The data processing system 120 can include at least one database 130. The database 130 can include a data repository having computer data storage or memory, and can store at least one first data file 135 and at least one second data file 140. Via at least one computer network 145, the data processing system 120 can communicate with at least one client computing device 150, at least one third party computing device 155, and at least one gateway device 160.

The network 145 can include computer networks such as the internet, local, wide, metro or other area networks, intranets, satellite networks, other computer networks such as data mobile phone communication networks, and combinations thereof. The network 145 can include any of a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 145 can include a wireless link, such as an infrared channel or satellite band. The topology of the network 145 can include a bus, star, or ring network topology. The network 145 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols. The network 145 can include at least one network that uses at least one LoRaWAN low power, wide area network protocol for data transmission to or from nodes or other devices such as the gateway device 160 and the data processing system 120. The network 145 can be used to transmit or receive information from various information resources, such as web pages, web-based applications, software-as-a-service applications, or servers that can be provided, output, rendered or displayed on at least one client computing device 150.

The data processing system 120 can include an interface designed, configured, constructed, or operational to communicate with the client computing device 150, the third party computing device 155, or the gateway device 160. The interface can receive and transmit information using one or more protocols, such as a network protocol. The interface can include a hardware interface, software interface, wired interface, or wireless interface. The interface can facilitate communication between one or more components of the data processing system 120. The interface can include or provide a user interface, such as a graphical user interface or frontend user interface. The interface can provide the user interface or access to a frontend interface via client computing device 150.

The client computing device 150, the third party computing device 155, and the gateway device 160 can each include at least one logic device such as a computing device having a processor to communicate with each other or with the data processing system 120 via the network 145. The client computing device 150 and the third party computing device 155 can each include at least one server, processor or memory, or a plurality of computation resources or servers located in at least one data center. The client computing device 150 and the third party computing device 155 can each include at least one computing device such as a desktop computer, laptop, tablet, personal digital assistant, smartphone, portable computer, server, thin client computer, virtual server, or other computing device.

The system 100 can include at least one node 165. For example, nodes 165 can be disposed on boundaries 115 of at least one zone 110, or between at least two zones 110. The nodes 165 can be disposed at equal lengths along a boundary 115. For example, a node 165 can be disposed every 10 meters, 20 meters, or 30 meters. Other distances above and below these examples are possible. The nodes 165 can be disposed or positioned on at least one boundary 115 in a non-uniform or clustered manner. For example based on field topography nodes 165 could be clustered along a boundary at the top or bottom of a hill, ridge, or other geographic feature. Clustered nodes 165 can be grouped more closely together than other nodes disposed in the field 105. For example, nodes 165 in a cluster can be disposed along a boundary 115 every five or ten meters, and other nodes along the same or different boundaries 115 in a field 105 can be disposed every 15 or 20 meters.

The nodes 165 can be coupled with an irrigation or other resource deployment system to the field 105. For example, the nodes 165 can be coupled with at least one pipe 205. The pipes 205 can convey water, fertilizer, pesticide, or other fluids or items through the field 105 for deployment onto the crop(s) present or growing in the field. The pipes 205 can define or be disposed along at least a portion of the boundaries 115 that define the zones 110.

Figure 2:
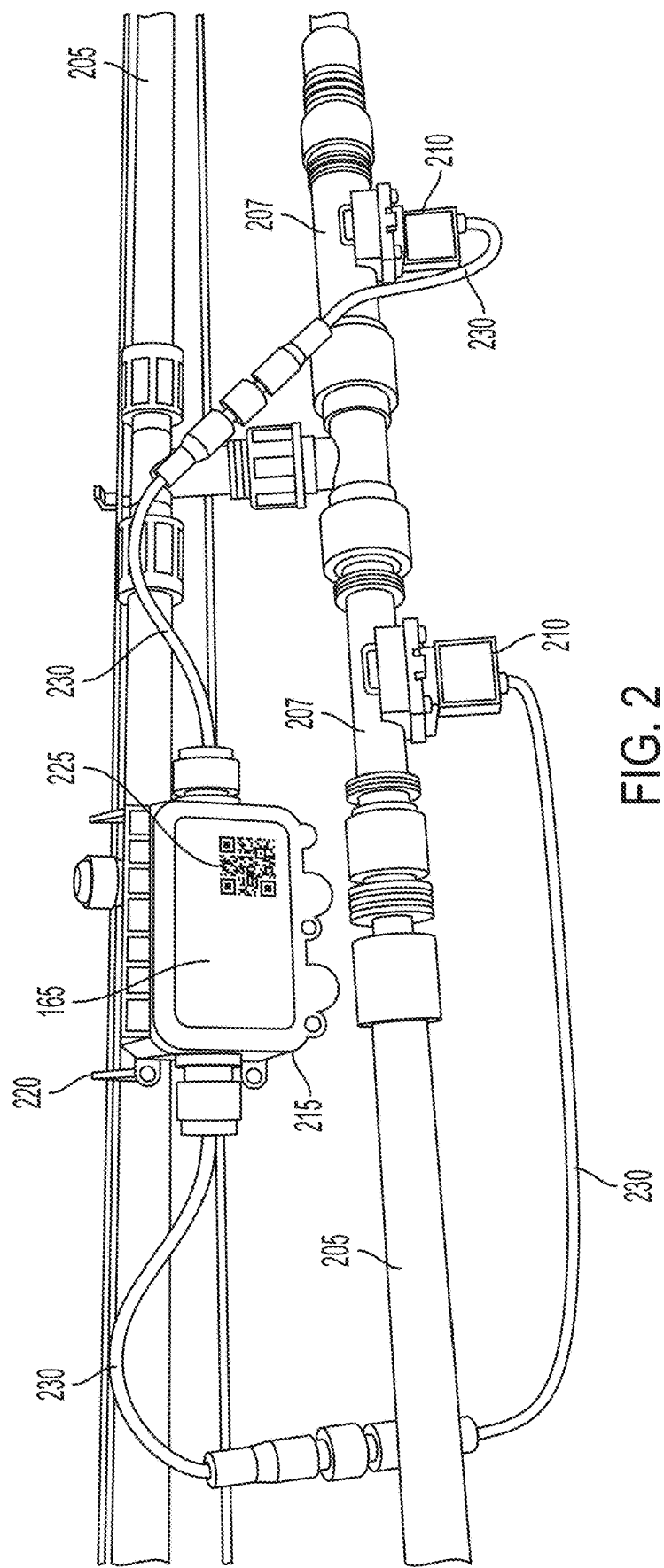
FIG. 2 is an illustration of an example node to dispose in a field to control resource distribution to the field, in accordance with implementations.
Figure 3:
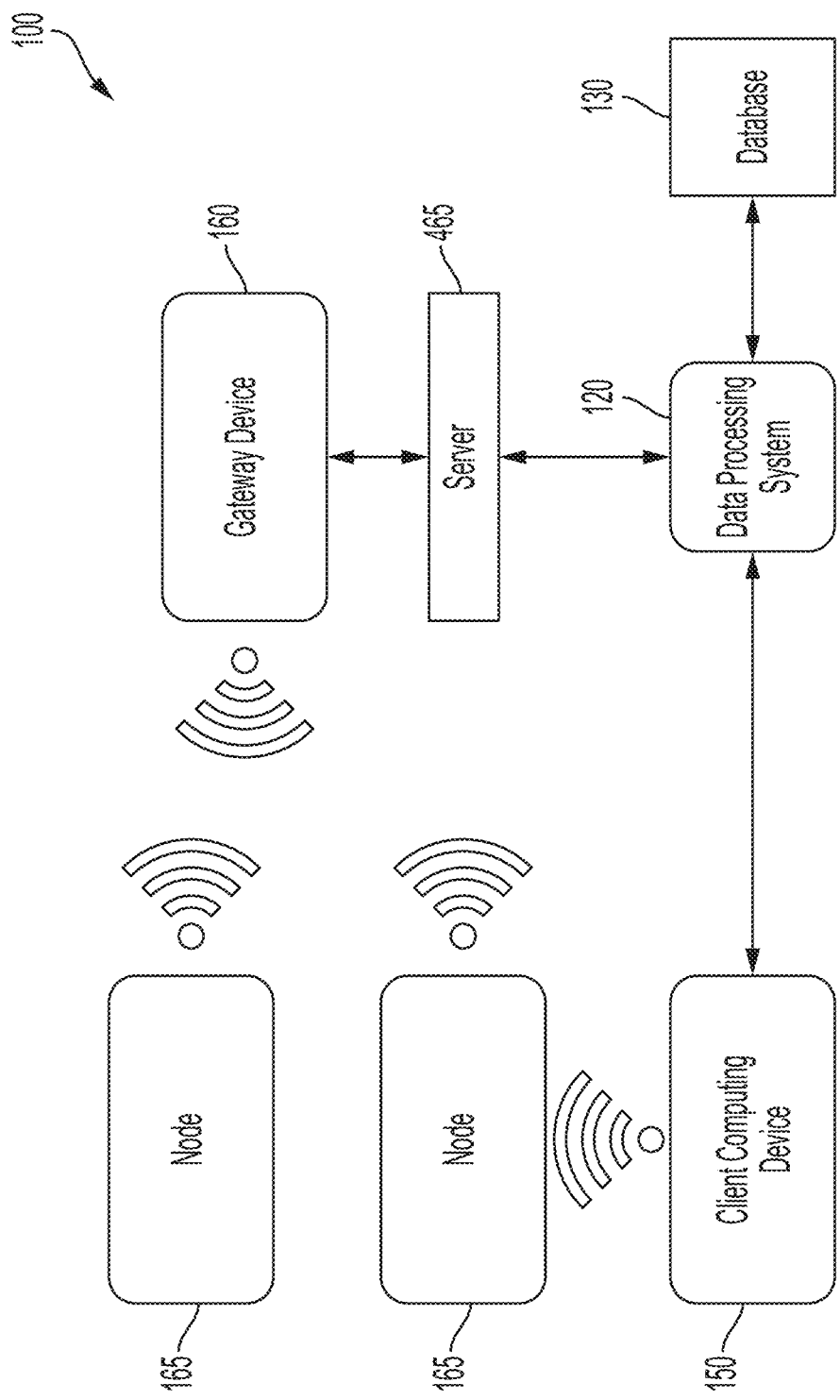
FIG. 3 is an illustration of an example system to control resource distribution in a field, in accordance with implementations.
Figure 4:
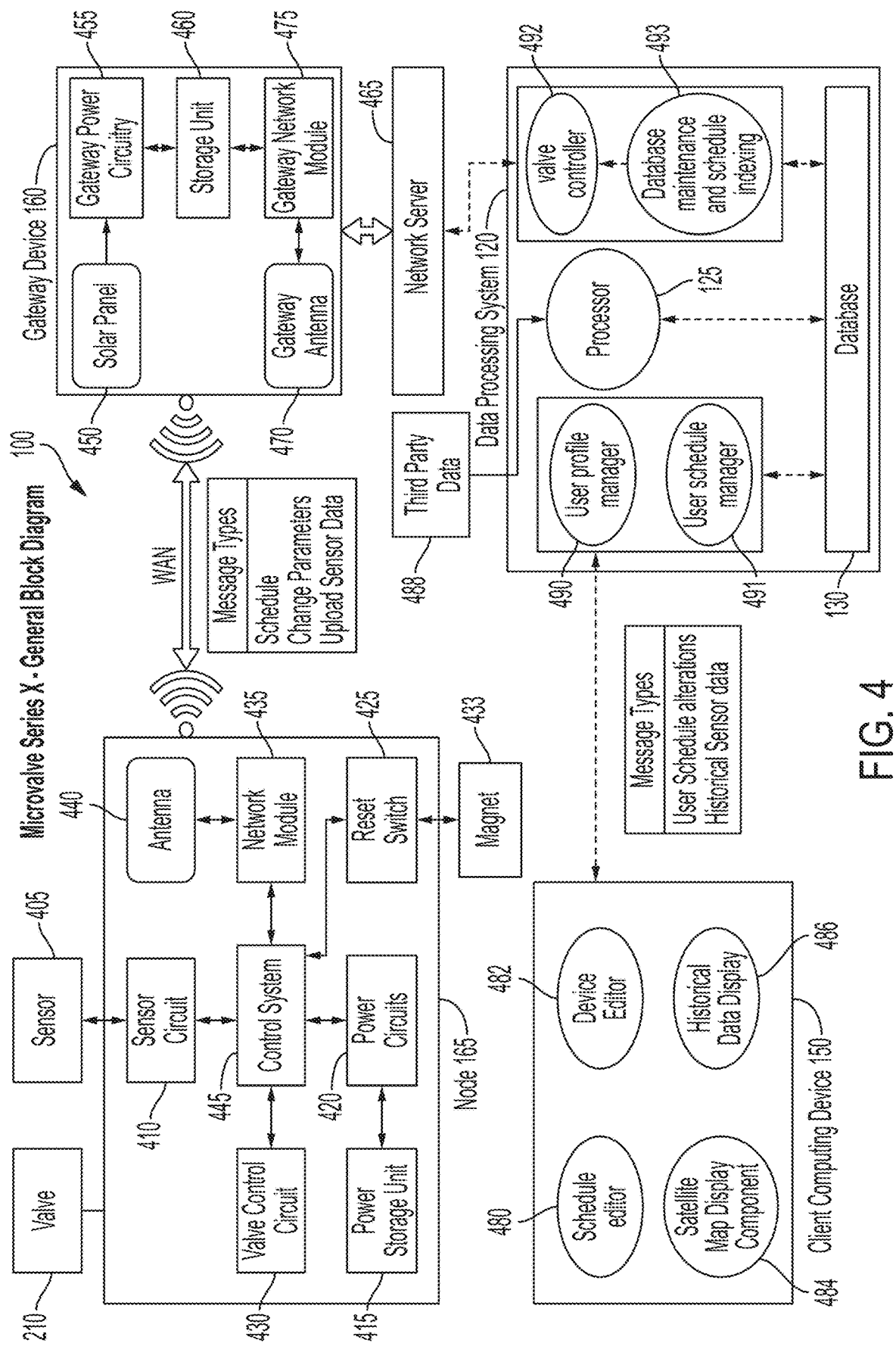
FIG. 4 is an illustration of an example system to control resource distribution in a field, in accordance with implementations.

FIG. 2 depicts an example node 165 to dispose in the field 105 to control resource distribution to the field 105. FIG. 3 and FIG. 4 depict example systems 100 to control resource distribution in at least one field 105. Referring to FIGS. 1-4, among others, the node 165 can include at least one valve 210. Valves 210 can be coupled with pipes 205 to control water or other resource deployment from the pipes onto the field 105, for example via drip irrigation or a sprinkler or other watering system. The node 165 can include or be coupled with one valve 210, exactly two valves 210, or more than two valves 210. For example, the node 165 can include and control two valves 210. These two valves 210 can be coupled with the same pipe 205, different pipes 205, or different portions of the same pipe 205 disposed along at least one boundary 115.

A first of these two valves 210 can control water or other resource distribution from a first pipe 205 to a first zone 110, and a second of these two valves 210 can control water or other resource distribution from a different portion of the same first pipe 205 or from a second pipe 205 to a second zone 110. In this example the first and second zones 110 can share a border, e.g., boundary 115 so that one node 165 can control valve actuation and corresponding resource distribution to at least portions of two different zones 110. The valve 210 can include an electrically controlled valve such as a solenoid valve. The valve 210 can couple with any portion of the pipe 205. For example the valve 210 can couple with the valve body 207, which can be considered part of the pipe 205 or a separate element attached to or fluidly coupled with the pipe 205.

The housing 215 of the node 165 can include at least one fastener 220. The fastener can secure to the node 165 to the pipe 205, or to a post, fence, plant, or other structure in the field 105. The fastener 220 can include a clamp, strap, hook, rivet, snap, bolt, screw, latch, lock, clasp or buckle to couple the node 165 with a structural element such as the pipe 205 along the boundary 115.

The node 165 can include at least one housing 215. The housing 215 can enclose at least some of the housing 215 components. The housing 215 can be made from plastic, metal, wood, other materials or combinations thereof. The housing 215 can have a length of 30 centimeters or less, and a width and depth of 20 centimeters or less. The housing 215 can be rectangular, square, cubic, circular, spherical, elliptical, or cylindrical in shape, or can be an irregular shape. The housing 215 can fully enclose or partially enclose at least some components such as a printed circuit board or other circuitry or hardware. The housing 215 can form a watertight enclosure around all or at least some components. The housing 215 can also include an opening to provide for connections with other components or to provide ventilation to the interior of the housing 215.

The node 165 can include at least one identifier 225. The identifier 225 can include at least one label, machine readable label, machine readable optical label, bar code, matrix bar code, or quick response (QR) code that includes identifying or other information about the node 165, such as an identifier, model number, or type of node. The identifier 225 can be printed on or molded into the housing 215, or on a label affixed to the housing 215 and can provide registration information to the client computing device, e.g., to a scanner thereof.

The node 165 can include at least one wire 230. For example the wire 230 can electrically and physically couple at least one valve 210 with the node 165, or with the housing 215 of the node. For example, the wire 230 can be used to carry control signals to actuate the valve 210 to distribute or stop distribution of a resource from the pipe 205. Components external to the housing 215, such as the valve 210 the wires 230, or other sensors can be considered to be part of the node 165, or can be considered as separate components that are couple with the node 165. For example, components directly or indirectly coupled with the housing 215 and internal circuitry of the node 165 (e.g., via cable 230) can be considered as part of the node 165, or can be considered as external components to the node 165.

The node 165 can include structural hardware components and accompanying software. For example, referring to FIG. 4 among others, the system 100 can include at least one sensor 405. The sensor 405 can include an air temperature sensor, soil moisture sensor, accelerometer, for example. The sensor 405 can identify or obtain field metric data of the field 105, such as environmental conditions or conditions of the field 105, field surroundings data, or data of the node 165. For example, the sensor 405 can include at least one temperature sensor that determines or detects the air temperature associated with the field 105. This can include the air temperature at or near ground level of the field 105, such as within 10 meters of ground level of the field. The sensor 405 can also determine or detect a degree of soil moisture of at least a portion of the field's soil. The soil moisture sensor(s) can at least partially penetrate the soil of the field 105, or be in contact with or proximate to (e.g., within 5 meters of) the surface of the field 105 to determine a moisture level of the soil or ground. The sensor 405 can also include at least one air humidity sensor that determines the degree of humidity of the air over at least part of the field 105. The sensor 405 can also include at least one accelerometer, e.g., an accelerometer sensor, vibration sensor, or tilt sensor. The sensor 405 that includes an accelerometer can detect motion. For example, when the accelerometer is coupled with node 165 the pipe 205, or other infrastructure, the accelerometer can determine that the infrastructure has tilted, fallen over, or shifted out of position due for example to find or lack of proper assembly. The sensor 405 can also include at least one flow meter. The flow meter can detect water or other fluid flow through at least one pipe 205, for example. Fluid flow information can be used by the node 165 or the data processing system 120 to determine operational characteristics of the field 105 or to control the valves 210. The data processing system 120 can also user accelerometer (sensor 405) data to determine fluid flow in pipes 205, as the fluid flow can cause the pipes vibrate. From this data, which can be sent to the data processing system 120 in a data file, the data processing system can determine if a pipe 205 is operating within a tolerance range or operating in an out of tolerance or anomalous state. For example, lack of vibration could indicate that no fluid or an insufficient amount of fluid is flowing, or that there has been no state change from a no-flow state to a flow state. The data processing system 120 can detect this state change based on accelerometer data. An alert to these or other anomalies can be provided to the client computing device 150 for display to the user, and can be used by the data processing system to create or adjust a resource distribution schedule for at least one node 165. Using the accelerometer to derive flow data an also reduce or eliminate the need for a flow meter or pressure sensor to measure fluid flow.

The node 165 can include at least one sensor circuit 410. The sensor circuit(s) 410 can include software, firmware or a circuit of at least one printed circuit board disposed in the node 165. The sensor circuit 410 can communicate with the sensor 405 to obtain field metric data sensed by the sensor 405. The sensor circuit 410 can communicate with the sensor 405 via wired or wireless communication. The node 165 can include a dedicated sensor circuit for each sensor 405. For example the system 100 can include an air temperature sensor 405 and a soil moisture sensor 410. The node 165 in this example could include a first sensor circuit 410 to control, obtain or package the data from the air temperature sensor 405 and a separate, second sensor circuit 410 to control, obtain or package the data from the soil moisture sensor 405. Different nodes 165 can have different sensor circuits 410 to communicate with different sensors 405. For example, a first node 165 could have a first sensor circuit 410 to communicate with a humidity sensor 405, and a second node 165 could have a second sensor circuit 410 to communicate with an accelerometer sensor 405.

The sensors 405 can be part of the node 165. For example, temperature or humidity sensors 405 can be embedded in, coupled with, or part of the housing 215. The sensors 405 can also be peripheral to or remote from the node 165. For example, flow meter or soil moisture sensors 405 can be external to and separate from the housing 215, and in communication with the sensor circuit 410 via wired, wireless, or remote communication.

The node 165 can include at least one power storage unit 415, e.g., a battery. The power storage unit 415 can provide power to components of the node 165, such as sensor circuit 410 or sensor 405. The node 165 can also include at least one power circuit 420. The power circuit 420 can include hardware, firmware, or software to control power usage of the power storage unit 415 by the node 165. For example, the power circuit 420 can be arranged or programmed to cause the power storage unit 415 or other components to enter a lower power state where power usage by the node 165 is reduced or stopped for a period of time. Power to the node 165 can also be provided externally, e.g., via a power cord or inductive charging. The data processing system 120 can obtain information about the state of the battery storage unit 415 and can use this information to adjust a resource distribution schedule for that node 165 or for a different node 165, such as an adjacent node 165 or another node 165 disposed on the same boundary 115.

The node 165 can include at least one reset switch 425. For example, the reset switch 425 can include at least one hall effect sensor that can be activated by a magnetic field introduced by at least one magnet 433. A user (e.g., a farmer) can wave or place the magnet 433 external to the node 165 and close to the portion of the node 165 where the reset switch 425 is disposed. The magnetic field can activate the reset switch 425 to reset or override electronics of the node 165 (e.g., sensor circuit 410 and other components). This external reset functionality can allow for node maintenance 165 (e.g., reset) without opening the housing 215, preserving for example the watertight seal created by the housing 215, and preventing tampering with or damage to internal components of the node 165. Thus the node 165 allows for non-invasive anomaly correction, debugging and troubleshooting with reset functionality.

The node 165 can include at least one valve control circuit 430. The valve control circuit can include hardware, firmware, a real time operating system, or software to control actuation of at least one valve 210 associated with the node 165. For example, the valve control circuit 430 can open or close the valve 210 to distribute water or another resource out from the pipe 205 and onto a portion of the field 105. The valve control circuit 430 can include at least one H-bridge control circuit, driven for example by a pulse width modulated signal to control current provided to (and to actuate) the valve 210. The valve control circuit 430 can control two valves 210 that are coupled with one node 165.

The node 165 can include at least one network module 440 and at least one antenna 440. The network module 435 can include hardware, firmware, or software to control communications to and from the node 165. For example, via the at least one antenna 440, the network module 435 can provide from the node 165 to the gateway device 160, and can receive data files from the gateway device 160. The network module 435 can receive wirelessly, from the gateway device 160, irrigation (or other resource distribution) schedules, or data files that include information to change node settings of the node 165. The network module 435 can also obtain and upload sensor data, such as temperature, humidity, moisture, or motion data sensed by sensor 405. This data can be arranged in a data file and transmitted by the network module 435 and antenna 440 from the node 165 to the gateway device 160. The network module 435 and the antenna 440 can operate using at least one LoRaWAN, or other low-power wide area networking or point-to multi-point networking protocol. For example, the network module 435 can include at least one LoRaWAN network module to communicate with the gateway device 160. The network module 435 can include at least one link management unit to communicate with the gateway device 160 or with at least one network server 465

The node 165 can include at least one control system 445. The control system 445 can include at least one microcontroller, processor, circuit board, firmware, software, or integrated circuit that controls at least some functions of the node 165, such as those of the sensors 405, sensor circuits 410, power storage unit 415, power circuits 420, reset switch 425, valve control circuit 430, network module 435, or antenna 440. The control system 445 can include at least one processor, central processing unit, or memory. The control system 445 can be programmable. The control system 445 can allow the node 165 to collect sensor information and send it to the data processing system 120 (e.g., via the gateway device 160) for processing, e.g., to determine an irrigation schedule. The control system 445 can obtain schedule information, e.g., from the gateway device 160 or from the end user computing device 150, and can supply actuation commands to the valve control circuit 430 to control irrigation in accordance with the schedule.

The at least one gateway device 160 can communicate with (e.g., all of) the nodes 165 disposed in the field 105, for example along boundaries 115 of zones 110, and the gateway device 160 can relay information such as data files back and forth between the node 165 and the data processing system 120. The gateway device 160 can include hardware, firmware or software. For example the gateway device 160 can include or be coupled with at least one solar panel 450 or other power source such as a battery. The gateway device 160 can also include gateway power circuitry 455 to control power to and from the solar panel 450, as well as a power storage unit 460 to store power generated for example by the solar panel 450. The gateway device 160 can provide the communication of data files (or other data) between the nodes 165 and the data processing system 120. For example the gateway device 160 can include or communicate with a network server 465 (e.g., a LoRaWAN network server or LNS) to relay data or other information between the database 130 and the node(s) 165. This data can include schedule data for resource deployment, changes in node 165 data or other changed parameters, or sensor data obtained by the sensors 405.

The gateway device 160 can be disposed in or near the field 105 to communicate with the nodes 165 deployed in the field 105. The gateway device 160 can be deployed within a zone 110 of the field, or external to the field boundary but within wireless communication range, for example via a LoRaWAN protocol. For example, the gateway device 160 can be deployed within 1000 meters of the closest point of an outer boundary 115 of the field 105 (or of a zone 110).

The gateway device 160 can include at least one gateway antenna 470 and at least one gateway network module 475. The gateway network module 475 can include hardware, firmware, or software to control communications to and from nodes 165 or data processing system 120. For example, via the gateway antenna 470, the gateway network module 475 can provide or receive data files to or from the gateway device 160 to the node 165 or the data processing system 120. The gateway network module 475 can receive wirelessly, from the node 165, queries or prompts for instructions, data files that include sensor data from sensor 405 or information about the node 165. The gateway network module 475 and the gateway antenna 470 can operate using at least one LoRaWAN, or other low-power wide area networking or point-to multipoint networking protocol.

The data processing system 120 can communicate with the gateway device 160 (e.g., via the network server 465) to manage the functions of the node(s) 165 to cause the valves 210 to open and close according to a resource distribution schedule provided, for example, by the client computing device 150. The database 130 can store and maintain the data collected from nodes 165 and sensors 405 as well as data collected from third party sources such as the third party computing device 155.

Based for example on information obtained from received data files, the data processing system 120 can monitor the nodes 165 and sensors 405 (or other components such as the gateway device 160) to determine how successfully they are performing. For example, the data processing system 120 can generate and store in the database or memory unit 130 a rolling canonical schedule of, for example, resource deployment. The data processing system 120 can also identify changes to resource deployment or to the resource deployment schedule initiated at the client computing device 150. From this information the data processing system can determine that sources of node 165 failure come from the user (client computing device 150) initiated changes or from the failure of a node 165 or other system 100 infrastructure. The database 130 can also keep logs of sensed data (e.g., soil moisture levels) or of valve 210 opening or closing times, for example. The database 130 can store this data in a compressed format, and the data processing system can generate textual or graphical representations of this data, e.g., using a graphQL query or API, and can provide these representations to the client computing device 150 for display.

The data processing system 120 can refresh, update, or replace cached data to improve query time or to remove expired or obsolete data. For example the data processing system 120 can parse satellite images of the field 105 or surrounding area of obtaining data such as weather data from the third party computing device 155. Expired or obsolete data can be transferred out from the data processing system 120 to a remote or external database for cold storage to increase storage space available in the database 130.

The client computing device 150 can operate as the end user's portal to the data processing system 120, and can provide the end user with functionality to create resource distribution schedules, view or browse sensor data, or create or edit node 165, gateway device 160, or field 105 information. The client computing device 150 can include at least one schedule editor 480, at least one device editor 482, at least one satellite map display component 484, or at least one historical data display component 486, each of which can include one or more scripts or applications that can launch on the client computing device 150 to provide their respective functionalities. For example, the schedule editor 480 can launch a program or application via a graphical user interface on the client computing device 150 to create or modify a resource deployment schedule. To create or adjust a schedule, each valve 210 can be allocated to a zone 110, and the zones 110 can be scheduled for resource deployment (e.g., irrigation) individually or in blocks or groups of zones, which permits scheduling of a field wide (or farm wide) event. The data processing system 120 can schedule uniform or staggered resource deployment across the zones 110 of the field 105 (or across multiple fields 105) to maintain pressure (e.g., water pressure) in the pipes 205 for water or other resource distribution. The data processing system 120 can schedule resource deployment to each zone 110 individually, to groups or blocks of zones that share a common irrigation schedule, or to each node 165 individually. The client computing device 150 can bypass the gateway device to communicate with the data processing system 120 or database 130, for example via network 145 (e.g., the internet or a cellular network) without passing through the gateway device or associated LoRaWAN network. The data transmitted between the client computing device 150 and the data processing system that bypass the gateway device 160 can include message types such as user-initiated resource deployment schedule alterations, or historical sensor or third party data.

The data processing system 120 can provide data sensed by the sensors 405 to the client computing device 150 for display. For example the historical display component 486 can launch a program or application via a graphical user interface on the client computing device 150 to display previously sensed data or other information such as past resource deployment data or data about system 100 components such as the nodes 165. The historical data display component 486 can display data indicating relationships between two or more zones 110 such as relative water usage or needs, or can display data indicating different sensor readings within a zone 110. The data processing system 120 can also generate and provide alerts based on sensed data, such as out of tolerance sensor readings that indicate tampering, component malfunction, or motion of system 100 hardware. The device editor component 482 can provide a user interface to edit or change data about a node 165 or other device or data. The device editor component 482 can also provide for registration of the nodes 165 or other components, e.g., via scanning a QR code or data entry of a node ID. The satellite map display component 484 can provide a user with an interface to see satellite data, including past or future forecasted weather information, and other soil, moisture, humidity, or topography information related to the field 105 or its surroundings. The client computing device 150 can communicate with the data processing system 120 via the network 145, to transmit or receive user resource deployment schedule alterations or historical sensor data, for example.

FIG. 3, among others, depicts an example system to control resource distribution in at least one field 105. The client computing device 150 can communicate with some or all of the nodes 165 to obtain identification, functionality, and location information of the node 165. For example the client computing device 150 can obtain this information via an optical scanner, wireless communication, wired communication, near field communication, or identification number data entry into the client computing device 150. During node 165 installation in a field 105, the user can carry the client computing device 150 to the points of installation of the nodes 165, and scan or otherwise obtain this information. The client computing device 150 can provide this information to the data processing system 120. This information, e.g., node 165 identification or location, can also be displayed by the client computing device 150.

The nodes 165 can also communicate in a bidirectional manner via wireless communication with the gateway device 160. This communication to the gateway device 160 can include a data file of sensed data obtained by the sensors 405, and can include prompts for instructions to distribute water or other resource from the valve 210. This communication from the gateway device 160 can include instructions or schedules for resource distribution. The gateway device 160 can obtain data from, and pass data to, the nodes 165, the data processing system 120, or the client computing device 150.

Figure 5:
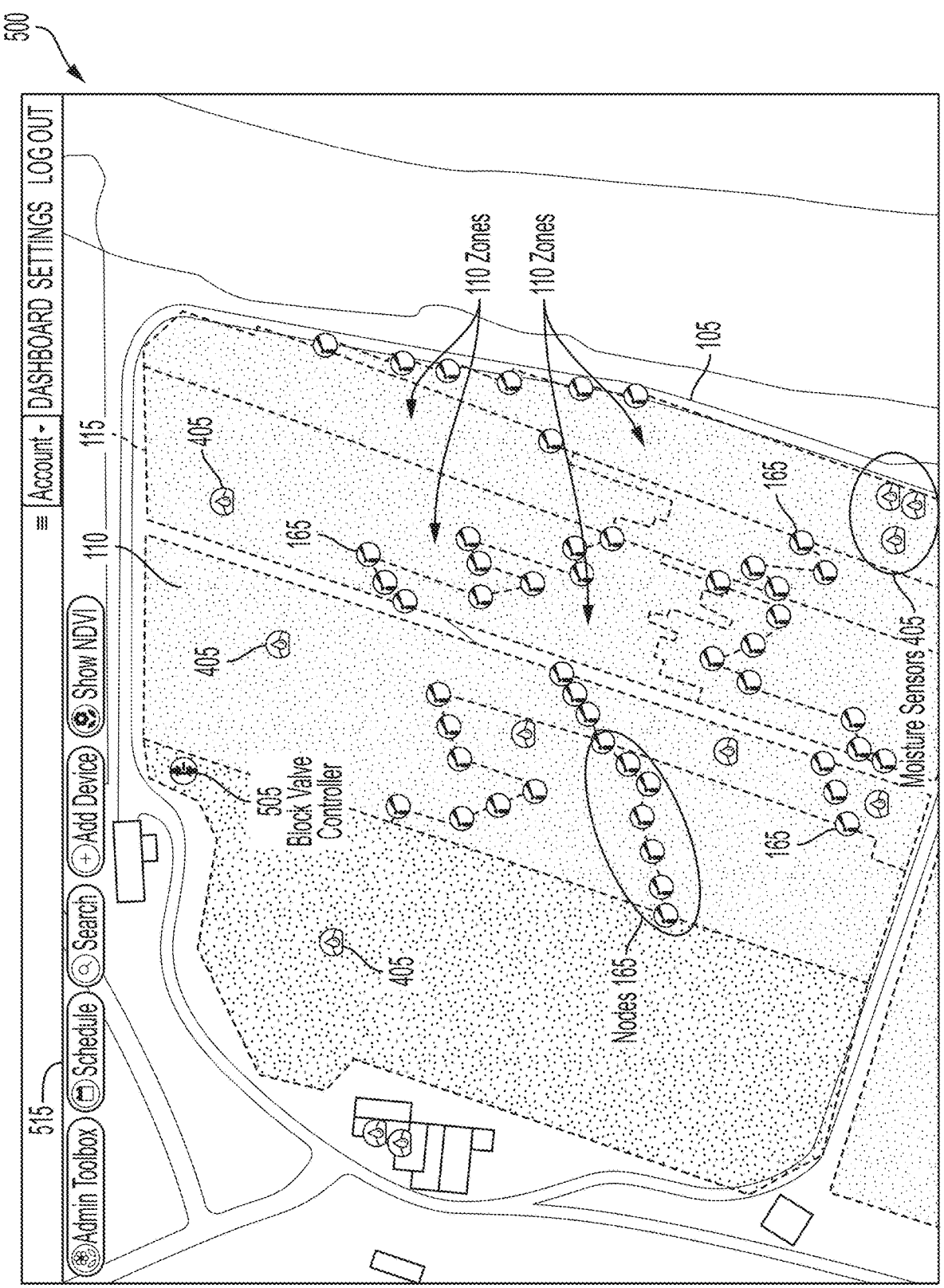
FIG. 5 is an illustration of an example user interface of a system to control resource distribution in a field, in accordance with implementations.

FIG. 5 depicts an example user interface 500 to control resource distribution in at least one field 105. The client computing device 150 can launch an application to display or render the interface 500 for display to an end user. The application executing on the client computing device (or displayed by the client computing device and executed remotely by the data processing system 120) can provide a rendering of the field 105. For example, to set a variable irrigation schedule, the application executes to display the field 105. This image can be retrieved from the database 130, from the third party computing device 155, third party data 488, or combinations thereof. For example the display of the field 105 can be based on satellite imagery. The interface 500 can provide for data entry to indicate the locations of the zones 110 or the locations of the nodes 165, e.g., along the boundaries 115 of the zones 110. For example, the user can enter an indication of zones 110 of the field 105, causing the interface 500 to display the zones 110 and their boundaries 115. The boundaries 115 for example can follow irrigation lines. This data can be entered via a stylus, touchscreen, or drawing or line tools provided by the application. The user can physically install the nodes 165 in the field 105 along the boundaries 115, for example by attaching the nodes 165 to pipes 205. With the node attached or otherwise fixed in its location the user can enroll the node 165 with an account associated with the system 100. For example, the client computing device 150 can obtain registration information of the node 165. The registration information can be obtained from identifier 225. For example, identifier 225 can include a QR code, and a camera (or scanner or barcode reader) of the client computing device 150 can scan the QR code to obtain identifying information of the device. The client computing device 150 can also obtain geographic location information of the installed node 165, e.g., from global positioning, GPS, or other location information of the client computing device 150 at the time of obtaining the registration information. From the location information included in the registration information obtained from the identifier 225, the data processing system 120 can correlate the node 165 with at least one zone 110. For example the node 165 disposed on the boundary 115 between two zones 110 can include two valves 210, where each valve 210 controls fluid flow to a different one of the two zones 110. The registration information correlates the node 165 with two zones, and disposing the node 165 on the boundary 115 where the node 165 can control for resource distribution to two different zones 110 allows for full field 105 distribution control with the minimal number of deployed nodes 165. In this example one node 165 having two valves 210 can regulate resource distribution between two zones 110. The node 165 or the client computing device 150 can include a location sensor, such as a global positioning system ("GPS") sensor, cellular network triangulation device, wireless network-based location device, or other location device.

The application executing on the client computing device 150 can display the location of the installed node 165, e.g., at a boundary 115 of at least one zone 110. The client computing device 150 can also receive, e.g., from the user, an indication of the zone(s) 110 that will be controlled by the installed node 165 via, for example, voice, touch, or data entry. This process of correlating the node 165 with at least one zone 110 and providing additional node data can repeat for the installation of all nodes 165 in the field 105. The client computing device 150 can cause the interface 500 to display the field with nodes 165 installed in position, for example disposed at zone boundaries 115.

The client computing device 150 can obtain location information of other system 100 hardware. For example, the field 105 can include at least one block valve controller 505 and at least one sensor 405 having moisture sensor capabilities. The block valve controller can control water or other fluid distribution to all or a portion of the field 105. The moisture sensor 405 can be associated with one or more nodes 165 to provide soil moisture information to at least one node 165. With the application setup complete, (e.g., with the nodes 165 and other hardware disposed in position and registered by the client computing device 150), the user can login via interface 500 to set the same or different irrigation schedules for all or at least one zone 110, for example using the schedule icon 515.

Referring to FIGS. 1-5, among others, the data processing system 120 can identify at least one zone 110 in at least one field 105. The data processing system 120 can obtain this information from the client computing device 150 via the network 145. For example, the client computing device 150 can obtain zone locations including zone boundaries 115 based on end user input and can provide this data in a data file (e.g., packet) to the data processing system 120. The data processing system 120 can also obtain zone location information from the database 130 or from the third party computing device 155.

The data processing system 120 can obtain registration information of at least one node 165. For example, the client computing device 150 can obtain this information based on scans of the identifier 225 of the node 165 with the node secured to the pipe 205 (or other infrastructure) in the field 105. The registration information can include a unique identifier to identify the specific node 165, the location of the node 165 in the field 105, or the zone(s) 110 whose resource distribution will be at least partially controlled by the node 165. The data processing system 120 can receive this data from the client computing device 150 via the network 145. The identifier 225 can also indicate or identify the sensors 405 that are part of or coupled with the node 165, as well as the type of sensor 405 or its functionality. For example, the identifier 225 could indicate that the node 165 includes a temperature sensor 405 and is coupled with a soil moisture sensor 405.

The data processing system 120 can obtain at least one first data file comprising field metric data. For example, nodes 165 installed in the field 105 can obtain data about portions of the field 105 or its surroundings via at least one sensor 405. This data can include measurements of air temperature, air humidity, soil moisture, acceleration data (e.g., of the node 165) flow data (e.g., of fluid in the pipe 205). The node(s) 165 can provide this data to the gateway device 160 via a LoRaWAN transmission or other protocol, where it can be aggregated into one or more data files for transmission from the gateway device 160 to the data processing system 120, where the data file(s) can be received. The data processing system 120 can store the first data file(s) in the database 130 and can process the first data file to determine or modify irrigation schedules (or other commands) to at least one zone 110. The data processing system 120 can adjust the resource distribution schedule based on a comparison of at least one of the field metric data and the data that pertains to the field with a threshold value. For example, if the field metric data indicates that soil moisture is below a threshold value, or if the data that pertains to the field indicates drought conditions, the data processing system 120 can adjust the resource distribution schedule to distribute more water to the field 105, through longer or more frequent periods of watering, for example.

The data processing system 120 can obtain at least one second data file. The second data file can include third party data that pertains to the field 105. The second data file can be obtained from at least one third party computing device 155, e.g., via the network 145. For example, the second data file can include data that pertains to the field 105 such as past weather data or future weather forecast data, as well as topographical data of the field, satellite data, imagery data, drought, fire, pollution, haze, particulate matter, or flooding data, or other climate, geographical, geological, or environmental information for a geographical area that includes at least part of the field 105. The data processing system 120 can store the second data file(s) in the database 130 and can process the second data file to determine or modify irrigation schedules (or other commands) to at least one zone 110.

The data processing system 120 can determine, create, or adjust at least one resource distribution schedule. For example, based on the first data file (e.g., sensed field data) or the second data file (e.g., third party data that pertains to the field 105), the data processing system 120 can determine to change an irrigation schedule for at least one zone 110. The processor 125 or other data processing system 120 logic component can parse the data in the first data file or the second data file to, for example, determine that one zone 110 should be irrigated for a longer period of time than presently scheduled due to its topography, or due to an ongoing drought, the type of crop growing in that zone, or other factors.

The data processing system 120 can receive at least one prompt from at least one node 165. For example, the control system 445 can generate and transmit (via antenna 440) the prompt to the gateway device 160, for example via a LoRaWAN or other bidirectional communication protocol. The prompt can include a query or request for instruction. The data processing system 120 can receive the prompt via the gateway device 160. For example, following a periodic schedule the node 165 can send an uplink or prompt to the gateway device 160, e.g., via a LoRaWAN protocol. This prompt can include (or be interpreted by the data processing system 120 as) a request for instructions. The gateway device 160 can receive this prompt from the node 165 and can relay or provide it to the data processing system 120, where the prompt can be received. The nodes 165 can transmit the prompts to the gateway device periodically, per a set schedule, or when the nodes 165 are instructed to do so, e.g., responsive to input from the end user or from the client computing device 150. Responsive or subsequent to receipt of the prompt, the data processing system 120 can retrieve resource distribution information, such as an irrigation schedule, from for example the database 130. This response can include an instruction for a node to control at least one valve 210. The instruction can cause the node 165, via the valve control circuit 430, to toggle the valve 210 to allow water or other fluid or resource to flow to at least a portion of the corresponding zone 110 of the field 105. The data processing system 120 can provide this instruction, e.g., as a downlink responsive to the received uplink prompt, from the data processing system 120 to the gateway device 160 via the network 145 that can include at least one network server 465. The data processing system 120 can determine to modify a resource distribution schedule, e.g., in time or frequency, based on or responsive to receipt of the prompt.

In response to the prompt, the control system 445 can receive an instruction to control the valve 210. This instruction be received from the data processing system 120 via the gateway device 160. The instruction can be transmitted at least in part using a communication protocol such as a LoRaWAN protocol. The instruction can cause the valve control circuit 430 to actuate, toggle, or otherwise control the valve 210 to open, close, or maintain current position to regulate the distribution of water or other resource to the zone 110 associated with the valve 210. The data processing system 120 can generate the instruction based on data that was sensed by the sensors 405 and third party data 488 obtained from the database 130 or from the third party computing device 155.

The data processing system 120 can identify the zones 110. For example, based on third party image data 488 such as satellite map image data, the data processing system 120 can identify environmental, topological, or geologic formations and can use this data to determine or propose boundaries 115 of zones 110. The data processing system 120 can provide this information to the client computing device 150 for consideration by the end user when creating zones 110 or when disposing nodes 165 in the field 105.

Figure 6:
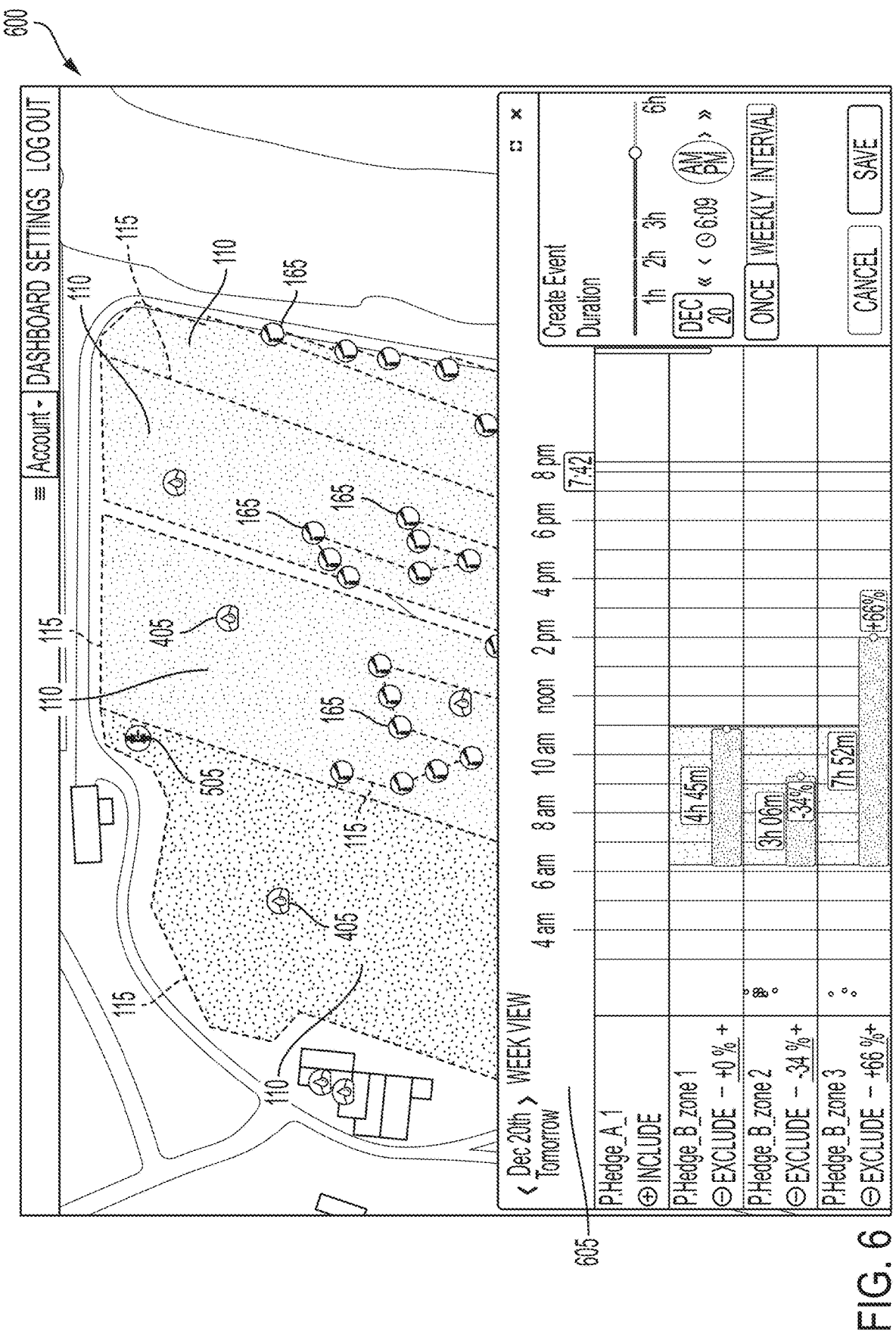
FIG. 6 is an illustration of an example user interface of a system to control resource distribution in a field, in accordance with implementations.

FIG. 6 depicts an example user interface 600 of a system 100 to control resource distribution in a field 105. The client computing device 150 can display the user interface 600. The user interface 600 (and interface 500) can be rendered or created locally by the client computing device 150, or remotely by the data processing system 120 and transmitted to the client computing device 150 for display. Local processing at the client computing device 150 can be considered as part of the data processing system 120. For example the data processing system 120 can provide an app or script to the client computing device 150 for installation and execution at the client computing device 150. The data processing system 120, e.g., via the app installed at the client computing device 150, can provide feedback about field performance, crop data, sensor information or other data to depict the performance or status of zones 110. The graphical user interface 600 can display the field 105, with the zones 110 delineated. The user interface 600 can display the nodes 165 in deployed position along the zone boundaries 115, and can display sensors 405, block valve controller 505 or other infrastructure such as all or part of the irrigation system.

The interface 600 can include at least one calendar interface 605. The calendar interface can display or be used to create or adjust a schedule or time to distribute resources to the field 105. For example water or other resource distribution times or schedules can be displayed for each zone. These times can be entered into the interface 600 (or other interface) of the client computing device 150, or can be received from the data processing system 120, for example based on data files having information from sensors 405 or data files from the third party computing device 155.

The data processing system 120 can provide data for display by interface 500 or interface 600 (or other interface) at the client computing device 150. For example the data processing system 120 can include at least one user profile manager 490, which can include at least one script or processing logic to update or edit a user account or profile. This can include information such as field 105 or node 165 location or information about an associated farm, crop, or end user. The data processing system 120 can also include at least one user schedule manager 491, valve controller 492, or database maintenance and schedule indexing component 493, each of which can include at least one script or processing logic element. The schedule manager 491 can generate, modify, or delete schedules for resource distribution. The valve controller 492 can generate, modify, or delete commands to provide to the nodes 165 that can cause the valve control circuit 430 to toggle, actuate, or maintain at least one valve 210. The database maintenance and schedule indexing component 493 can manage the database 130 to remove obsolete data or categorize data properly.

Figure 7:
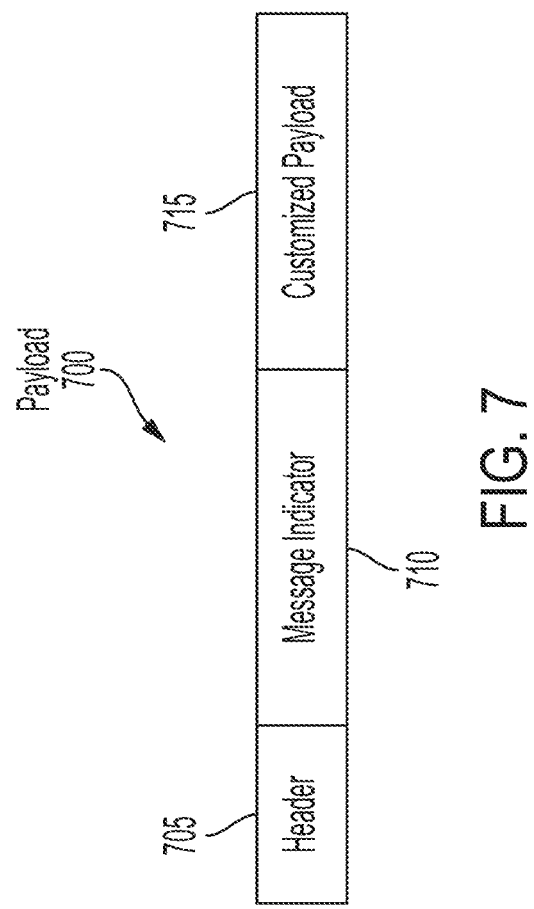
FIG. 7 is an illustration of an example payload that includes data for a system to control resource distribution in a field, in accordance with implementations.

FIG. 7 depicts an example payload 700 that includes data for the data processing system 120 to use to control resource distribution scheduling in the field 105. For example, the sensor circuit 410 can obtain field metric data from the sensors 405, such as temperature, moisture, humidity or acceleration data. The control system 445 can package this data into at least one payload 700 that includes sensed field metric data or other data. The antenna 440 the network module 435 can prepare and transmit the payload to the gateway device 160, e.g., as a data file, using a bidirectional communication protocol such as a LoRaWAN protocol. This data file or payload can be stored in the database 130 for use by the data processing system 120 to determine or adjust a control schedule for the valves 210. The payload 700 can include at least one header 705, at least one message indicator 710, and at least one customized payload 715. The payload header 705 can describe payload information related to the transport or reconstruction of the sensed data. For example, in a LoRaWAN protocol the header 705 can include network information that identifies the node 165, analogous to an internet protocol address. The message indicator 710 can include at least one field such as a port field or FPort to distinguish between different types of messages. The customized payload 715 can include the sensed data from the field 105 or other customized data. The payload 700 can be transmitted from the node 165 to the gateway device 160, for example as a data file.

The payload 700 structure and data processing system 120 scheduling of resource deployment optimizes network 145 for scale by spreading out communications with the various devices of system 100. For example all devices (e.g., nodes 165) can synchronize in real-time, which allows for precise timing of resource deployment without the need to acquire, calculate or calibrate this information from the data processing system 120. Node 165 failures that may occur can remain localized, without disrupting the system with repetitive uplinks or prompts for instructions from the data processing system 120, which minimizes network congestion and reduces unnecessary bandwidth. The nodes 165 can include an automatic recovery mode, e.g., via the magnet 433 and the reset switch 425 that does not drain battery usage or require extensive recovery time.

Figure 8:
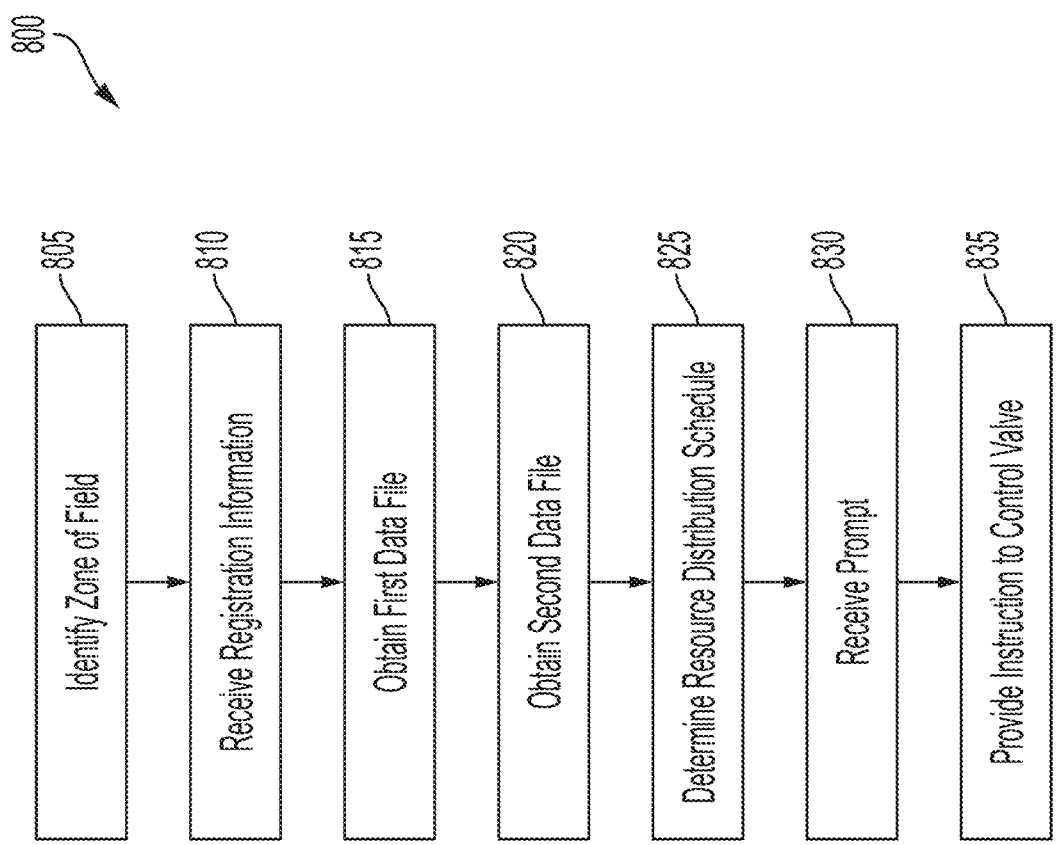
FIG. 8 is an illustration of an example method of controlling resource distribution to a field, in accordance with implementations.

FIG. 8 depicts an example method 800 of controlling resource distribution to a field 165. The method 800 can include identifying at least one zone 110 of at least one field 105 (ACT 805). For example the data processing system 120 can identify a plurality of zones 110 based on data received from the client computing device 150, the database 130, third party data 488, the nodes 165, or the third party computing device 155. For example, an end user can interface with an application executing at the client computing device 150 to input information that identifies, creates, or delineates the zones 110. This information can be received (ACT 805) by the data processing system 120, for example as the application executing at the client computing device 150 or via communication transmissions from the node 165 to the gateway device 160, and then to the data processing system 120 via at least one network 145. The application executing at the client computing device 150 can include a script or can be included as part of the data processing system. The received information can indicate the locations of zones 110 or their borders 115 in at least one field 105.

The method 800 can receive registration information (ACT 810). For example, the data processing system 120 can receive registration information for at least one node 165 from the client computing device 150. The registration information can correlate the node 165 with at least one zone 110 in the field 105. For example the registration information can indicate a location along the boundary 115 where the node 165 is installed. The client computing device can determine the location of the node 165 and provide this location to the data processing system 120. The node 165 can also include global positioning capability to determine its geographic location and provide this location to the data processing system 120 via the gateway device 160.

The method 800 can include obtaining at least one first data file (ACT 815). For example the node 165 can create the data file and transmit the data file to the gateway device 160. The gateway device 160 can relay or forward the data file to the data processing system 120 via the network 145, where it can be received. The first data file can include information created or sensed by at least one the sensor 405 associated with a node 165.

The method can include obtaining at least one second data file (ACT 820). For example the data processing system can obtain a data file including third party data 488, or data obtained from the database 130 or from the third party computing device 155. The second data file can include information that pertains to the field 105, such as climate, weather, topographical, or atmospheric data of an area that can include at least part of the field 105.

The method 800 can determine a resource distribution schedule (ACT 825). The data processing system 120 can create, obtain, generate, or receive (e.g., from the client computing device 150) a schedule that indicates at least one time for at least one node 165 to deploy a resource within at least one zone 110. For example the resource distribution schedule can include an irrigation schedule to water the field 105. The data processing system 120 can determine (e.g., generate, create, or identify) the resource distribution schedule based on data included in the first data file or data included in the second data file. For example, if data in the first data file indicates soil moisture levels or humidity above a threshold, or if data in the second data file indicates that it rained on the field 105 within a threshold time period or above a threshold amount, the data processing system can delay an irrigation event for a determined period of time, such as 12 hours, 24 hours, or 48 hours, among other time periods.

The method 800 can include receiving at least one prompt (ACT 830). For example, the gateway device 160 can receive a prompt from at least one node 165 via a communications protocol wireless transmission from the node 165, e.g., via the network 145. The gateway device 160 can transmit the prompt(s) to the data processing system 120 individually upon receipt, or aggregated in one or more batch transmissions.

The method 800 can include providing at least one instruction to control at least one valve 210 (ACT 835). For example, the data processing system 120 can determine when or that it is time to deploy a resource from at least one node 165. Responsive to the prompt, the data processing system can provide an instruction, via the gateway device 160, to the node 165. The instruction can cause the node 165, via the valve control circuit 430, to actuate, toggle, or maintain the state of at least one valve 210, which can cause deployment of water or other resource to at least a portion of at least one zone 110 to start, stop, or continue.

Figure 9:
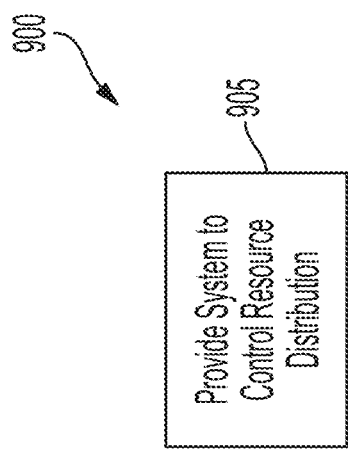
FIG. 9 is an illustration of an example method of providing a system to control resource distribution to a field, in accordance with implementations.

FIG. 9 depicts an example method 900 of providing a system to control resource distribution to a field 105 (ACT 905). The provided system can include at least one data processing system 120 having one or more processors 125 coupled with memory 130. The data processing system 120 can identify a plurality of zones 110 of the field 105. The data processing system 120 can receive, from the client computing device 150, registration information of a node 165. The registration information can map or correlates the node 165 with a zone 110 of the plurality of zones 110 of the field 105. The data processing system 120 can obtain, via the gateway device 160 and from the node 165, a first data file that includes field metric data. The data processing system 120 can obtain a second data file that can include third party data that pertains to the field. The data processing system 120 can determine a resource distribution schedule based at least in part on the field metric data of the first data file and the data that pertains to the field of the second data file. The data processing system can receive, via the gateway device, a prompt from the node 165. The data processing system 120 can provide to the node 165 via the gateway device 160, an instruction to control a valve 210 to regulate resource distribution via the valve 210 to a portion of the zone 110 of the plurality of zones 110 of the field 105.

Figure 10:
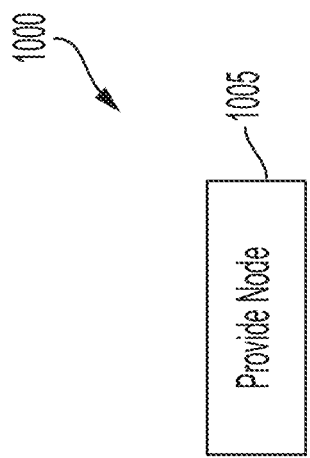
FIG. 10 is an illustration of an example method of providing a node to dispose in a field to control resource distribution to the field, in accordance with implementations.

FIG. 10 depicts an example method 1000 of providing a node to dispose in a field 105 to control resource distribution to the field 105 (ACT 1005). The provided node 165 can be disposed in a field 105 to control resource distribution to the field 105. The node 165 can include at least one machine readable optical label to provide registration information to a scanner of the client computing device 150. The node 165 can include at least one sensor 405 to obtain field metric data of the field 105. The node 165 can include at least one control system 445 to generate a payload that includes the field metric data and to transmit the payload via the antenna 440 of the node 165 to the gateway device 160 via a bidirectional communication protocol. The control system 445 can transmit a prompt, via the antenna 440 and the bidirectional communication protocol, to the gateway device 160. The prompt can include a query for instruction. Responsive, for example, to the prompt, the control system 445 can receive from the gateway device 160 via the bidirectional communication protocol, an instruction to control a valve 210 to regulate resource distribution via the valve 210 to at least a portion of a zone 110 of the least one of a plurality of zones 110 of the field 105. The instruction can be based on the field metric data and based on third party data that pertains to the field.

The field 105 can include an irrigation system, and the distributed resource can be water. The water can be supplemented with chemicals such as fertilizer, nutrients, or pesticide. The variable irrigation techniques afforded by the system 100 allows growers to dynamically control water (or other resource) distribution on their farms at zone or node level granularity. With the valves 210 in an open position the irrigation from the pipes 205 can be in the firm of surface irrigation, sprinkler irrigation, center pivot irrigation, lateral move irrigation, sub-irrigation, or drip irrigation, for example. The node control techniques described herein allow for zones 110 in low-demand areas to receive less water while zones 110 in high-demand areas receive more water (or other resource). The hardware products such as the nodes 165, valves 210, block valve controller 505, and sensors 405 can be fitted on deployed irrigation systems, e.g., on pipes 205. The valves 210 divide the field 105 into discrete zones 110 that can be managed individually by the data processing system 120 to offer variable rate irrigation (or other resource deployment) to the field 105. The data processing system 120, which can include software installed at the client computing device 150, can allow end users (e.g., farmers or growers) to set or obtain specific irrigation schedules for each zone 110 of the field 105. The data processing system 120 also provides feedback about field performance. The end user can use this feedback to adjust the distribution schedule. The sensor information can be displayed to the end user by the client computing device 150 to indicate the performance of zones 165.

In some examples the nodes 165 do not have solar panels and do not receive power from external sources once charged and deployed in the field 105. For example, the nodes 165 can use low power hardware and optimized firmware architecture to allow devices in the field to least for, for example, 5 year or more without use of solar power.

The components of system 100 can collect many types of data and allow the data processing system 120 to determine optimal ways to manage water, fertilizer, or other resource distribution for one or more crops of a farm. The data processing system 120 can receive data from each node 165 or sensor 405, as well as from the third party computing device 155 or from the end user via the client computing device 150. From this data, the data processing system 120 can determine on a node-by node or zone-by-zone basis when to actuate individual valves 210 disposed in the field 105.

Figure 11:
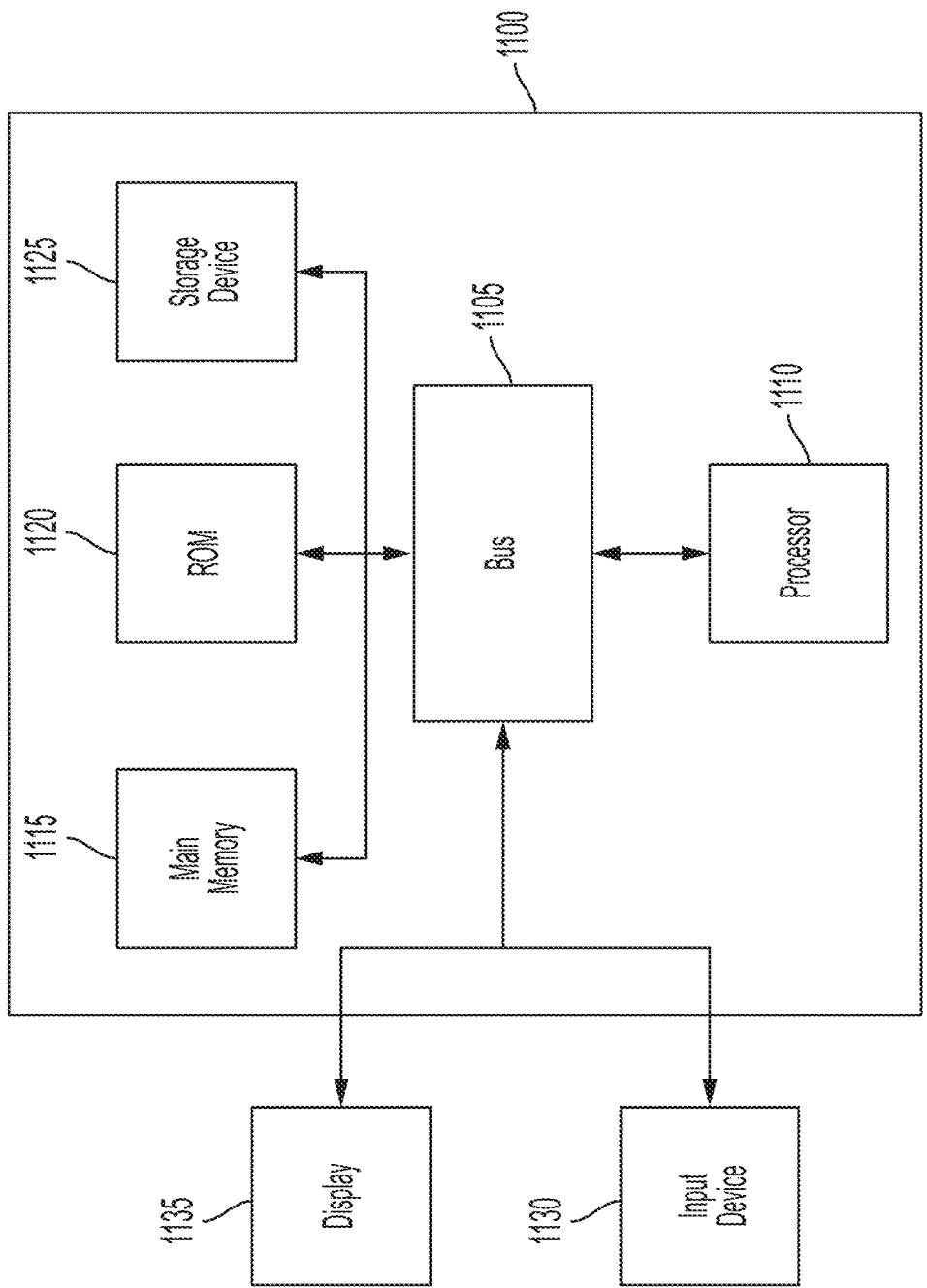
FIG. 11 is a block diagram illustrating an architecture for a computer system that can be employed to implement elements of the systems and methods described and illustrated herein, in accordance with implementations.

FIG. 11 depicts an architecture for a computer system 1100 that can be employed to implement elements of the systems and methods described and illustrated herein, in accordance with implementations. The system 100 can include one or more component or functionality depicted FIG. 11. One or more component or functionality of system 1100 can be provided along with or in conjunction with one or more component or function of system 100 depicted in FIG. 1. The client computing device 150, the third party computing device 155, the gateway device 160, the data processing system 120 or the node(s) 165 can include one or more component depicted in FIG. 11.

The computer system or computing device 1100 can include or be used to implement the system 100 or its components such as the data processing system 120. The computing system 1100 includes a bus 1105 or other communication component for communicating information and a processor 1110 or processing circuit coupled with the bus 1105 for processing information. The computing system 1100 can also include one or more processors 1110 or processing circuits coupled to the bus for processing information. The computing system 1100 also includes main memory 1115, such as a random access memory (RAM) or other dynamic storage device, coupled with the bus 1105 for storing information, and instructions to be executed by the processor 1110. The main memory 1115 can be or include the database 130. The main memory 1115 can also be used for storing position information, temporary variables, or other intermediate information during execution of instructions by the processor 1110. The computing system 1100 may further include a read only memory (ROM) 1120 or other static storage device coupled to the bus 1105 to store static information and instructions for the processor 1110. A storage device 1125, such as a solid state device, magnetic disk or optical disk, can be coupled with the bus 1105 to persistently store information and instructions. The storage device 1125 can include or be part of the database 130. The processor 1110 can be or include processor 125.

The computing system 1100 can be coupled via the bus 1105 to a display 1135, such as a liquid crystal display, or active matrix display, for displaying information to a user. An input device 1130, such as a keyboard including alphanumeric and other keys, may be coupled to the bus 1105 to communicate information and command selections to the processor 1110. The input device 1130 can include a touch screen display 1135. The input device 1130 can also include a cursor control, such as a mouse, a trackball, or cursor direction keys to communicate direction information and command selections to the processor 1110 and to control cursor movement on the display 1135. The display 1135 can be part of the data processing system 120, the client computing device 150 or other component of FIG. 1, for example.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, data processing system 120 and client computing device 150 and other system 100 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 120) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network 145. Examples of communication networks include a local area network ("LAN") and a wide area network ("WAN"), a LoRaWAN, an inter-network (e.g., the Internet), and peer-to-peer networks (e.g., ad hoc peer-to-peer networks).

The computing system such as system 100 or system 1100 can include clients and servers. A client and server are generally remote from each other and typically interact through a communication network (e.g., the network 145). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 120 from the client computing device 150, node 165, gateway device 160, or third party computing device 155.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the application executing on the client computing device to provide, for example interface 500 and interface 600 can be a single component, app, or program, or a logic device having one or more processing circuits, or part of one or more servers of the data processing system 120.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, crops in the field 105 can be agricultural (e.g., food) or non-agricultural (e.g., non-edible flowers or plants for biofuel) crops. The data processing system 120 can include, interface, or otherwise communicate with at least one client computing device 150, at least one third party computing device 155, at least one gateway device 160, or at least one node 165.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to control resource distribution to a field, comprising:
a data processing system comprising one or more processors coupled with memory to:
identify a plurality of zones of the field based on satellite map image data;
receive, from a client computing device, registration information of a node, the registration information correlates the node with a first zone and a second zone of the plurality of zones of the field;
launch an application to display a graphical representation of the field based on the satellite map image data, the graphical representation including the plurality of zones with the node disposed on a boundary between the first zone and the second zone of the plurality of zones;
obtain, via a gateway device and from the node, a first data file comprising field metric data;
obtain a second data file, the second data file comprising third party data that pertains to the field;
determine a resource distribution schedule based at least in part on the field metric data of the first data file and the data that pertains to the field of the second data file;
receive, via the gateway device, a prompt from the node; and
responsive to the prompt, provide to the node via the gateway device, an instruction to control a first valve of the node disposed on the boundary to regulate resource distribution via the first valve to a portion of the first zone of the plurality of zones of the field and an instruction to control a second valve of the node disposed on the boundary to regulate resource distribution via the second valve to a portion of the second zone of the plurality of zones.

2. The system of claim 1, comprising:
the data processing system to obtain the satellite map image data during a communication session with the client computing device.

3. The system of claim 1, comprising:
the node including a sensor, wherein the registration information of the node includes a unique node identifier, a node location in the field, and an identification of the sensor.

4. The system of claim 1, comprising:
the node is a first node of a plurality of nodes, the plurality of nodes disposed on boundaries of the plurality of zones.

5. The system of claim 1, comprising:
the field metric data including at least one of an air humidity measurement, and air temperature measurement, a soil moisture measurement, a fluid flow measurement, and an acceleration measurement;
the data that pertains to the field including at least one of weather forecast data and satellite data; and
the data processing system to adjust the resource distribution schedule based on a comparison of at least one of the field metric data and the data that pertains to the field with a threshold value.

6. The system of claim 1, comprising:
the registration information indicating a location along the boundary between the first zone and the second zone where the node is installed.

7. The system of claim 1, comprising:
the gateway device having a solar panel, a power storage unit, and an antenna.

8. The system of claim 1, comprising:
the gateway device disposed within 1000 meters of an outer boundary of the field and the gateway device having an antenna to communicate with the node.

9. The system of claim 1, comprising:
the node including a control system to actuate the first valve and the second valve.

10. The system of claim 1, comprising:
the data processing system to obtain the second data file from a third party computing device.

11. The system of claim 1, comprising the data processing system to:
receive, via the application launched from the client computing device, a user input to the graphical representation of the field; and
provide to the node via the gateway device, responsive to receiving the user input, a second instruction to control the first valve.

12. The system of claim 1, comprising:
the first valve of the node to distribute a first amount of a resource via the first valve to the first zone; and
the second valve of the node to distribute a second amount of the resource via the second valve to the second zone, the second amount being greater than the first amount.

13. The system of claim 1, comprising:
the first valve of the node to distribute a first resource via the first valve to the first zone; and
the second valve of the node to distribute a second, different resource via the second valve to the second zone.

14. A node to dispose in a field to control resource distribution to the field, comprising:
a machine readable label to provide registration information, including location information, to a scanner of a client computing device;
a sensor to obtain field metric data of the field; and
a control system to:
generate a payload that includes the field metric data and transmit the payload via an antenna of the node to a gateway device via a bidirectional communication protocol;
transmit a prompt, via the antenna and the bidirectional communication protocol, to the gateway device, the prompt including a query for instruction;
responsive to the prompt, receive from the gateway device via the bidirectional communication protocol, an instruction to control a first valve to regulate resource distribution via the first valve to a portion of a first zone of a plurality of zones of the field identified based on satellite map image data and an instruction to control a second valve to regulate resource distribution via the second valve to a portion of a second zone of the plurality of zones, the node disposed on a boundary between the first zone and the second zone, and the instruction based on the field metric data and based on third party data that pertains to the field; and provide the location information to the client computing device to display a graphical representation of the field based on the satellite map image data, the graphical representation including the plurality of zones.

15. The node of claim 14, comprising:

a LoRaWAN network module to control communication with the gateway device.

16. The node of claim 14, comprising:

a power storage unit, a reset switch, a control circuit, and a sensor circuit.

17. The node of claim 14, comprising:

the control system including a circuit board and firmware that generates the payload that includes the field metric data.

18. A method of controlling resource distribution to a field, comprising:

identifying, by a data processing system comprising one or more processors coupled with memory, a plurality of zones of the field based on satellite map image data;

receiving, by the data processing system from a client computing device, registration information of a node, the registration information correlating the node with a first zone and a second zone of the plurality of zones of the field;

providing, via an application launched from the client computing device, a display of a graphical representation of the field based on the satellite map image data, the graphical representation including the plurality of zones with the node disposed on a boundary between the first zone and the second zone of the plurality of zones;

obtaining, via a gateway device and from the node, a first data file comprising field metric data;

obtaining a second data file, the second data file comprising third party data that pertains to the field;

determining a resource distribution schedule based at least in part on the field metric data of the first data file and the data that pertains to the field of the second data file;

receiving, via the gateway device, a prompt from the node; and responsive to the prompt, providing to the node via the gateway device, an instruction to control a first valve of the node disposed on the boundary to regulate resource distribution via the first valve to a portion of the first zone of the plurality of zones of the field and an instruction to control a second valve of the node disposed on the boundary to regulate resource distribution via the second valve to a portion of the second zone of the plurality of zones.

19. The method of claim 18, comprising:

the registration information indicating a location along the boundary between the first zone and the second zone where the node is installed.

20. The method of claim 18, comprising:

receiving, via the application launched from the client computing device, a user input to the graphical representation of the field; and providing to the node via the gateway device, responsive to receiving the user input, a second instruction to control the first valve.

\* \* \* \* \*